(12) United States Patent
Kiener et al.

(10) Patent No.: US 11,814,558 B2
(45) Date of Patent: Nov. 14, 2023

(54) METHOD FOR PRODUCING ARTICLES COATED WITH ADHESIVE

(71) Applicant: BASF SE, Ludwigshafen am Rhein (DE)

(72) Inventors: Christoph Kiener, Ludwigshafen (DE); Lars Heckhoff, Ludwigshafen (DE); Peter Preishuber-Pfluegl, Ludwigshafen (DE); Richard Bociek, Ludwigshafen (DE)

(73) Assignee: BASF SE

(*) Notice: Subject to any disclaimer, the term of this patent is extended or adjusted under 35 U.S.C. 154(b) by 709 days.

(21) Appl. No.: 16/970,486

(22) PCT Filed: Feb. 15, 2019

(86) PCT No.: PCT/EP2019/053818
§ 371 (c)(1),
(2) Date: Aug. 17, 2020

(87) PCT Pub. No.: WO2019/162206
PCT Pub. Date: Aug. 29, 2019

(65) Prior Publication Data
US 2021/0079272 A1    Mar. 18, 2021

(30) Foreign Application Priority Data
Feb. 21, 2018 (EP) ..................................... 18157764

(51) Int. Cl.
| | | |
|---|---|---|
| *C09J 7/38* | (2018.01) | |
| *C08L 39/06* | (2006.01) | |
| *C09J 133/02* | (2006.01) | |
| *C09J 139/06* | (2006.01) | |
| *C09J 175/04* | (2006.01) | |
| *B32B 37/12* | (2006.01) | |
| *B32B 37/20* | (2006.01) | |
| *B05D 1/28* | (2006.01) | |
| *B05D 5/10* | (2006.01) | |

(52) U.S. Cl.
CPC ........... *C09J 7/385* (2018.01); *B32B 37/1284* (2013.01); *B32B 37/20* (2013.01); *C08L 39/06* (2013.01); *C09J 133/02* (2013.01); *C09J 139/06* (2013.01); *C09J 175/04* (2013.01); *B05D 1/28* (2013.01); *B05D 5/10* (2013.01); *B05D 2201/04* (2013.01); *B05D 2502/00* (2013.01); *B32B 2309/14* (2013.01); *C09J 2301/302* (2020.08); *C09J 2433/00* (2013.01); *C09J 2475/00* (2013.01)

(58) Field of Classification Search
CPC ........ C09J 7/385; C09J 139/06; C09J 174/04; B32B 37/1284; C08L 39/06
See application file for complete search history.

(56) References Cited

U.S. PATENT DOCUMENTS

| | | | |
|---|---|---|---|
| 3,412,054 A | 11/1968 | Milligan et al. | |
| 3,905,929 A | 9/1975 | Noll | |
| 3,920,598 A | 11/1975 | Reiff et al. | |
| 4,192,937 A | 3/1980 | Noll et al. | |
| 4,269,748 A | 5/1981 | Nachtkamp et al. | |
| 4,292,226 A | 9/1981 | Wenzel et al. | |
| 4,337,325 A | 6/1982 | Shah | |
| 5,610,232 A * | 3/1997 | Duan | C08G 18/0819 524/840 |
| 2013/0078407 A1 | 3/2013 | Shimokuri et al. | |
| 2018/0022854 A1 | 1/2018 | Blaisdell et al. | |

FOREIGN PATENT DOCUMENTS

| | | | |
|---|---|---|---|
| CA | 1 129 128 A | 8/1982 | |
| DE | 1 495 745 | 6/1969 | |
| DE | 1 954 090 | 5/1971 | |
| DE | 2 034 479 | 1/1972 | |
| DE | 39 11 827 A1 | 10/1990 | |
| EP | 0 155 557 A1 | 9/1985 | |
| EP | 0 622 378 A1 | 11/1994 | |
| EP | 0792926 A2 * | 9/1997 | ............ C09J 157/00 |
| JP | 7-305036 * | 11/1995 | ................ C09J 7/00 |
| JP | 2773834 * | 4/1998 | ................ C09J 7/02 |
| JP | 4673534 B2 * | 1/2011 | ............ C09J 131/02 |
| TW | 201231168 A1 * | 8/2012 | ............... B05C 5/00 |
| WO | WO 98/23656 A1 | 6/1998 | |

(Continued)

OTHER PUBLICATIONS

Tan, Yvonne Tze Fung, et al., "Investigation of interpolymer complexation between Carbopol and various grades of polyvinylpyrrolidone and effects on adhesion strength and swelling properties". J. Pharm Pharmaceut Sci 4(1): 7-14, 2001.*
Al-Harbi, Laila M., et al., "Adsorption of Polyvinylpyrrolidone over the Silica Surface: As Affected by Pretreatment of Adsorbent and Molar Mass of Polymer Adsorbate". International Journal of Polymer Science vol. 2016, Article ID 2417292, May 2016, pp. 1-9.*
International Search Report dated Oct. 11, 2019 in PCT/EP2019/053818 filed on Feb. 15, 2019, 2 pages.
International Search Report for PCT Patent Application No. PCT/EP2019/053818, dated Apr. 30, 2019, 3 pages.

(Continued)

*Primary Examiner* — Bret P Chen
(74) *Attorney, Agent, or Firm* — Faegre Drinker Biddle & Reath LLP

(57) ABSTRACT

Described is a process for producing adhesive-coated articles, wherein an aqueous dispersion adhesive composition comprising a dispersed adhesive polymer and a dissolved polyvinylpyrrolidone is applied at high web speed to a film substrate using a coating machine having at least one rotating roller and wherein the coated film substrate may optionally be bonded to a further substrate. Also described is the use of polyvinylpyrrolidone as a defoamer for aqueous dispersion adhesive compositions applied to a film substrate using a coating machine having a rapidly rotating roller.

22 Claims, No Drawings

(56) References Cited

FOREIGN PATENT DOCUMENTS

| WO | WO 00/50480 A1 | | 8/2000 | |
|---|---|---|---|---|
| WO | WO 03/102066 A2 | * | 12/2003 | ............. C08L 11/02 |
| WO | WO 2005/113627 A1 | * | 12/2006 | ............. C08G 18/08 |
| WO | WO 2013/117428 A1 | * | 8/2013 | ............ C09J 133/08 |
| WO | WO 2014/019891 A1 | * | 2/2014 | ................ C08J 5/12 |
| WO | WO 2016/124251 A1 | | 8/2016 | |
| WO | WO 2017/102497 A1 | | 6/2017 | |
| WO | WO 2017/177920 A1 | * | 10/2017 | ............ C08F 218/08 |

OTHER PUBLICATIONS

International Preliminary Report on Patentability and Written Opinion of the International Searching Authority dated Aug. 27, 2020 in PCT/EP2019/053818 filed Feb. 15, 2019, 7 pages.

* cited by examiner

METHOD FOR PRODUCING ARTICLES COATED WITH ADHESIVE

The invention relates to a process for producing adhesive-coated articles, wherein an aqueous dispersion adhesive composition comprising a dispersed adhesive polymer and a dissolved polyvinylpyrrolidone is applied at high web speed to a film substrate using a coating machine having at least one rotating roller. Also described is the use of polyvinylpyrrolidone as a defoamer for aqueous dispersion adhesive compositions applied to a film substrate using a coating machine having a rapidly rotating roller.

There is a great demand for inexpensive adhesives for composite film lamination with good performance properties, for example for flexible foodstuffs packaging. Adhesive systems based on organic solvents are widely used in this application. Water-based adhesive systems are a desirable alternative for reducing organic solvent emissions. Aqueous polymer dispersions comprising dispersed acrylate ester polymers, also known as acrylate latex, or polyurethane dispersions are of particular importance.

Acrylate ester-based adhesives for laminating applications are described in WO 98/23656, WO 00/50480 and WO 2017/102497 for example. When polymer dispersions produced by emulsion polymerization using emulsifiers are used, undesirable foam formation can occur during mechanical film coating, in particular if the coating is carried out by means of rotating rollers at a high web speed of the film web. It is known in principle to carry out emulsion polymerization also substantially without emulsifiers if protective colloids are used in place of the emulsifiers. Typical protective colloids are acid-containing polymers which are water-soluble upon neutralization of the acid groups at elevated pH. However, the protective colloids can act as foam stabilizers and this can in turn lead to unwanted foam formation during mechanical film coating. A reduction in the content of emulsifiers and protective colloids is not readily possible, since the polymer dispersions are then generally not sufficiently stable, for example are not shear-stable, and may undergo coagulation, especially in the case of large industrial scale production thereof on the metric ton scale. WO 2017/102497 does describe low-emulsifier aqueous polymer dispersions having a reduced propensity for foam formation, but in applications for film coatings having high web speeds of the film web a further minimization of the foam formation is desirable.

The propensity for foaming caused by the emulsifiers, wetting agents and protective colloids present in the adhesive polymer dispersions is disruptive especially when high speed and a large excess of dispersion are used; i.e. if the dispersion is stirred very vigorously by the application roller or is recirculated several times. Either process engineering measures (foam settling tanks) or chemical additives (defoamers) are then required. The defoamers, for example based on silicone, based on organic oils, higher alcohols or derivatives thereof, nonionogenic acetylene compounds and aliphatic hydrocarbons, show different efficacy depending on the auxiliary system present in the polymer dispersion which can also decrease with increasing storage time.

The defoamer may for example float, settle or diffuse into the polymer and is then no longer available at the liquid/air interface. Or the defoamer may undesirably impair the adhesive effect.

The object was to provide a process for mechanical coating of films with aqueous adhesive dispersions at a high web speed, in the case of which undesired foam formation is minimized to the greatest possible extent while stability of the adhesive dispersion and adhesive effects are ideally not impaired or impaired to the smallest possible extent, for example in terms of composite adhesion values.

It has been found that the object can be achieved by the process more particularly elucidated hereinbelow.

The invention provides a process for producing adhesive-coated articles, wherein an aqueous dispersion adhesive composition comprising
(a) at least one adhesive polymer dispersed in the aqueous phase and
(b) at least one polyvinylpyrrolidone dissolved in the aqueous phase is applied to a film substrate using a coating machine with at least one rotating roller, wherein the web speed of the film substrate is at least 150 m/min, preferably at least 200 m/min, and wherein the coated film substrate is optionally bonded to a further substrate.

The invention also provides for the use of an aqueous dispersion adhesive composition comprising
(a) at least one adhesive polymer dispersed in the aqueous phase and
(b) polyvinylpyrrolidone dissolved in the aqueous phase for producing films mechanically coated with the dispersion adhesive composition, preferably for producing composite films, or for laminating rigid shaped articles with flexible decorative films mechanically coated with the dispersion adhesive composition, wherein the aqueous dispersion adhesive composition is applied to a film substrate by means of a coating machine having at least one rotating roller, wherein the web speed of the film substrate is at least 150 m/minute.

The invention also provides for the use of polyvinylpyrrolidone as a defoamer for aqueous dispersion adhesive compositions applied to a film substrate using a coating machine having at least one rotating roller, wherein the web speed of the film substrate is at least 150 m/minute.

The text below occasionally uses the designation "(meth)acrylic" or "(meth)acrylate" and similar as an abbreviating notation for "acrylic or methacrylic" or "acrylate or methacrylate". In the designation Cx-alkyl (meth)acrylate and analogous designations, x denotes the number of carbon atoms in the alkyl group.

The glass transition temperature is determined by differential scanning calorimetry (ASTM D 3418-08, so-called midpoint temperature). The glass transition temperature of the polymer in the polymer dispersion is the glass transition temperature obtained when evaluating the second heating curve (heating rate 20° C./min).

The dispersion adhesive composition preferably comprises
(i) from 30% to 60% by weight, particularly preferably from 40% to 55% by weight, of the at least one adhesive polymer and
(ii) from 0.02% to 2% by weight, particularly preferably from 0.04% to 1.2% by weight, of the polyvinylpyrrolidone.

The adhesive polymer is preferably selected from polyurethanes and polymers producible by free-radical emulsion polymerization of ethylenically unsaturated, free-radically polymerizable monomers, also referred to hereinbelow as emulsion polymer. The free-radically polymerizable monomers preferably comprise
a) at least 60% by weight, based on the total amount of monomers, of at least one monomer selected from the group consisting of C1- to C20-alkyl acrylates, C1- to C20-alkyl methacrylates, vinyl esters of carboxylic acids comprising up to 20 carbon atoms, vinylaromatics having up to 20 carbon atoms, vinyl halides, vinyl ethers of alcohols comprising 1 to 10 carbon atoms, aliphatic hydrocarbons having 2 to 8 carbon atoms and one or two double bonds, and mixtures of these monomers,
b) at least 0.1% by weight, based on the total amount of monomers, of at least one monomer having at least one acid group, preferably selected from the group consisting of acrylic acid, methacrylic acid, itaconic acid, maleic acid, fumaric acid, crotonic acid, vinylacetic acid, vinyllactic acid, vinylsulfonic acid, styrenesulfonic acid, acrylamidomethylpropanesulfonic acid, sulfopropyl acrylate, sulfopropyl methacrylate and mixtures of these monomers;
c) optionally at least one further monomer distinct from the monomers a) and b).

The adhesive polymer is preferably producible by free-radical emulsion polymerization of ethylenically unsaturated, free-radically polymerizable monomers comprising
a) 60% to 99.9% by weight, based on the total amount of monomers, of at least one monomer selected from the group consisting of C1- to C20-alkyl acrylates, C1- to C20-alkyl methacrylates, vinylaromatics having up to 20 carbon atoms, and
b) 0.1% to 5% by weight, based on the total amount of monomers, of at least one monomer having at least one acid group selected from acrylic acid, methacrylic acid and itaconic acid and
c) 0% to 10% by weight, based on the total amount of monomers, of further monomers distinct from the monomers a) to b), selected from the group consisting of acrylamide, methacrylamide, N-methylolacrylamide, N-methylolmethacrylamide, phenyloxyethylglycol mono(meth)acrylate, hydroxyl-comprising monomers, amino-comprising monomers, nitriles, alpha,beta-monoethylenically unsaturated C3-C8-carboxylic acids, bifunctional monomers which comprise not only an ethylenically unsaturated double bond but also at least one glycidyl group, oxazoline group, ureido group or ureido-analogous group, and crosslinking monomers having more than one free-radically polymerizable group.

Monomers a)

The monomer mixture preferably consists of at least 60% by weight, preferably to an extent of at least 80% by weight, for example from 60% to 99.9% by weight or from 80% to 99.9% by weight or from 80% to 98% by weight, particularly preferably to an extent of at least 90% by weight, based on the total amount of monomers, of at least one monomer a) selected from the group consisting of C1- to C20-alkyl acrylates, C1- to C20-alkyl methacrylates, vinyl esters of carboxylic acids comprising up to 20 carbon atoms, vinylaromatics having up to 20 carbon atoms, vinyl halides, vinyl ethers of alcohols comprising 1 to 10 carbon atoms, aliphatic hydrocarbons having 2 to 8 carbon atoms and one or two double bonds, and mixtures of these monomers.

Suitable monomers a) are for example (meth)acrylic acid alkyl esters having a $C_1$-$C_{10}$-alkyl radical, such as methyl methacrylate, methyl acrylate, n-butyl acrylate, ethyl acrylate and 2-ethylhexyl acrylate, and also behenyl (meth) acrylate, isobutyl acrylate, tert-butyl (meth)acrylate and cyclohexyl (meth)acrylate. In particular, mixtures of the (meth)acrylic acid alkyl esters are also suitable. Vinyl esters of carboxylic acids having 1 to 20 carbon atoms are, for example, vinyl laurate, vinyl stearate, vinyl propionate, Versatic acid vinyl esters, and vinyl acetate. Contemplated vinylaromatic compounds include vinyltoluene, alpha- and para-methylstyrene, alpha-butylstyrene, 4-n-butylstyrene, 4-n-decylstyrene and, preferably, styrene. The vinyl halides are ethylenically unsaturated compounds substituted by chlorine, fluorine or bromine, preferably vinyl chloride and vinylidene chloride. Examples of vinyl ethers include for example vinyl methyl ether or vinyl isobutyl ether. Vinyl ethers of alcohols comprising 1 to 4 carbon atoms are preferred. Hydrocarbons having 4 to 8 carbon atoms and two olefinic double bonds include butadiene, isoprene and chloroprene. Preferred monomers a) include the $C_1$- to $C_{10}$-alkyl acrylates, $C_1$- to $C_{10}$-alkyl methacrylates, in particular $C_1$- to $C_8$-alkyl acrylates and methacrylates and also styrene and mixtures thereof. Especially particularly preferred are methyl acrylate, methyl methacrylate, ethyl acrylate, n-butyl acrylate, n-butyl methacrylate, n-hexyl acrylate, octyl acrylate and 2-ethylhexyl acrylate, 2-propylheptyl acrylate, styrene and also mixtures of these monomers.

Monomers b)

The monomer mixture preferably consists to an extent of at least 0.1% by weight, in particular from 0.1% to 5% by weight or from 0.5% to 3% by weight, based on the total amount of monomers, of at least one ethylenically unsaturated monomer having at least one acid group (acid monomer). The acid monomers b) comprise not only monomers comprising at least one acid group but also anhydrides thereof and salts thereof. The monomers b) include alpha, beta-monoethylenically unsaturated monocarboxylic and dicarboxylic acids, half-esters of alpha,beta-monoethylenically unsaturated dicarboxylic acids, the anhydrides of the abovementioned alpha,beta-monoethylenically unsaturated carboxylic acids and also ethylenically unsaturated sulfonic acids, phosphonic acids or dihydrogenphosphates and water-soluble salts thereof, for example alkali metal salts thereof. Examples thereof are acrylic acid, methacrylic acid, itaconic acid, maleic acid, fumaric acid, crotonic acid, vinylacetic acid and vinyllactic acid. Examples of suitable ethylenically unsaturated sulfonic acids include vinylsulfonic acid, styrenesulfonic acid, acrylamidomethylpropanesulfonic acid, sulfopropyl acrylate and sulfopropyl methacrylate. Preferred monomers b) are alpha,beta-monoethylenically unsaturated C3-C8-carboxylic acids and C4-C8-dicarboxylic acids, for example itaconic acid, crotonic acid, vinylacetic acid, acrylamidoglycolic acid, acrylic acid and methacrylic acid and also anhydrides thereof. Particularly preferred monomers b) are itaconic acid, acrylic acid and methacrylic acid.

The acid groups of the monomer b) may still be present in unneutralized form at the beginning of the polymerization and be fully or partially neutralized by feeding of a base only during or after the emulsion polymerization, wherein for example the feeding of the base commences during the emulsion polymerization (i.e. after commencement of the polymerization reaction) once at least 5% by weight, preferably 10% to 70% by weight, of the total monomer mixture is present in the reaction vessel under polymerization conditions. The neutralizing agent may be added for example in a separate feed simultaneously with the feeding of the monomer mixture. After feeding of all of the monomers, the polymerization vessel preferably contains the amount of neutralizing agent required for neutralizing at least 10%, preferably 10% to 100% or 25% to 90%, of acid equivalents. Suitable bases are, for example, sodium hydroxide solution, potassium hydroxide solution, ammonia (preferably in aqueous solution) or organic amines, preferably tertiary amines, in particular trialkylamines preferably having 1 to 4 carbon atoms in the alkyl group, such as for example triethylamine.

Monomers c)

The monomer mixture may optionally comprise at least one further monomer c) distinct from the monomers a) and b). The monomers c) may be employed for example in amounts of from 0% to 10% by weight or from 0% to 5% by weight, in particular from 0.1% to 10% by weight or from 0.1% to 5% by weight or from 0.2% to 3% by weight, based on the total amount of monomers.

Monomers c) are, for example, neutral and/or nonionic monomers having elevated solubility in water, for example the amides or the N-alkylolamides of the abovementioned ethylenically unsaturated carboxylic acids, for example acrylamide, methacrylamide, N-methylolacrylamide and N-methylolmethacrylamide or phenyloxyethyl glycol mono (meth)acrylate. Monomers c) further include, for example, hydroxyl-comprising monomers, in particular the hydroxyalkyl esters of the abovementioned alpha,beta-monoethylenically unsaturated carboxylic acids, preferably $C_1$-$C_{10}$-hydroxyalkyl (meth)acrylates, such as for example hydroxyethyl acrylate, hydroxyethyl methacrylate, hydroxypropyl acrylate or hydroxypropyl methacrylate, and also 4-hydroxybutyl acrylate.

Monomers c) further include, for example, also amino-comprising monomers, in particular the aminoalkyl esters of the abovementioned alpha,beta-monoethylenically unsaturated carboxylic acids, preferably $C_1$-$C_{10}$-aminoalkyl (meth)acrylates, such as for example 2-aminoethyl (meth)acrylate or tert-butylaminoethyl methacrylate. Additionally contemplated as monomers c) are the nitriles of alpha,beta-monoethylenically unsaturated C3-C8-carboxylic acids, such as for example acrylonitrile or methacrylonitrile.

Suitable monomers c) also include bifunctional monomers which comprise not only an ethylenically unsaturated double bond but also at least one glycidyl group, oxazoline group, ureido group, ureido-analogous group or carbonyl group, and crosslinking monomers having more than one free-radically polymerizable group. Examples of glycidyl group monomers are ethylenically unsaturated glycidyl ethers and glycidyl esters, for example vinyl, allyl and methallyl glycidyl ethers, and glycidyl (meth)acrylate. Examples of carbonyl group monomers are the diacetonyl-amides of the abovementioned ethylenically unsaturated carboxylic acids, for example diacetone(meth)acrylamide, and the esters of acetylacetic acid with the abovementioned hydroxyalkyl esters of ethylenically unsaturated carboxylic acids, for example acetylacetoxyethyl (meth)acrylate.

Examples of oxazoline group monomers c) are those of the formula:

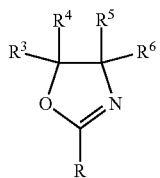

wherein the radicals are defined as follows:

R is a $C_{2\text{-}20}$-alkenyl radical comprising at least one ethylenically unsaturated group;

$R^3$, $R^4$, $R^5$ and $R^6$ are independently of one another selected from H, halogen, $C_{1\text{-}20}$-alkyl, $C_{2\text{-}20}$-alkenyl, $C_{6\text{-}20}$-aryl, $C_{7\text{-}32}$-arylalkyl, $C_{1\text{-}20}$-hydroxyalkyl, $C_{1\text{-}20}$-aminoalkyl and $C_{1\text{-}20}$-haloalkyl, preferably selected from H, halogen and $C_{1\text{-}20}$-alkyl. The oxazoline monomers are especially preferably at least one monomer selected from the group consisting of 2-vinyl-2-oxazoline, 2-vinyl-4-methyl-2-oxazoline, 2-vinyl-5-methyl-2-oxazoline, 2-vinyl-4-ethyl-2-oxazoline, 2-vinyl-4,4-dimethyl-2-oxazoline, 2-vinyl-5,5-dimethyl-2-oxazoline, 2-vinyl-4,4,5,5-teramethyl-2-oxazoline, 2-isopropenyl-2-oxazoline, 2-isopropenyl-4-methyl-2-oxazoline, 2-isopropenyl-5-methyl-2-oxazoline, 2-isopropenyl-4-ethyl-2-oxazoline, 2-isopropenyl-5-ethyl-2-oxazoline, 2-isopropenyl-4,4-dimethyl-2-oxazoline, 2-isopropenyl-5,5-dimethyl-2-oxazoline and 2-isopropenyl-4,4,5,5-tetramethyl-2-oxazoline. The use of 2-vinyl-2-oxazoline and/or 2-isopropenyl-2-oxazoline is particularly preferred; 2-isopropenyl-2-oxazoline (iPOx) is especially preferred.

Examples of ureido group or ureido-analogous group monomers c) are, for example, those of the formula

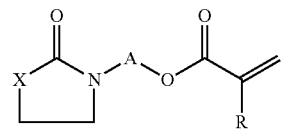

wherein X is $CH_2$, O, NH or $NR^1$ and $R^1$ is a C1- to C4-alkyl group, R is hydrogen or methyl, and A is a divalent linking group, preferably a C1- to C10-alkyl group or a C2- to C4-alkyl group. Particularly preferred are ureidoalkyl (meth)acrylates having 1 to 10 carbon atoms, preferably 2 to 4 carbon atoms, in the alkyl group, in particular ureidoethyl methacrylate (UMA).

Further examples of monomers c) are crosslinking monomers which have more than one free-radically polymerizable group, in particularly two or more (meth)acrylate groups, such as butane-diol di(meth)acrylate or allyl methacrylate, for example.

Preferred monomers c) are those which allow postcrosslinking of the polymer, for example with polyfunctional amines, hydrazides, isocyanates or alcohols. Crosslinking is also possible through metal-salt crosslinking of the carboxyl groups, using polyvalent metal cations, e.g. Zn or Al.

Suitable crosslinking may be accomplished, for example, by the polymer comprising keto groups or aldehyde groups (preferably 0.0001 to 1 mol, or 0.0002 to 0.10 mol, or 0.0006 to 0.03 mol) and the polymer dispersion additionally comprising a compound having at least 2 functional groups, in particularly 2 to 5 functional groups, which enter into a crosslinking reaction with the keto or aldehyde groups. The keto or aldehyde groups may be bonded to the polymer through copolymerization of suitable monomers c). Suitable monomers c) are, for example, acrolein, methacrolein, vinyl alkyl ketones having 1 to 20, preferably 1 to 10, carbon atoms in the alkyl radical, formylstyrene, (meth)acrylic acid alkyl esters having one or two keto or aldehyde groups, or one aldehyde group and one keto group, in the alkyl radical, the alkyl radical preferably comprising a total of 3 to 10 carbon atoms, e.g. (meth)acryloyloxyalkylpropanals. N-oxoalkyl(meth)acrylamides are moreover also suitable. Particularly preferred are acetoacetyl(meth)acrylate, acetoacetoxyethyl(meth)acrylate and especially diacetoneacrylamide.

Examples of compounds which are able to enter into a crosslinking reaction with the keto or aldehyde groups are compounds having hydrazide, hydroxylamine, oxime ether or amino groups. Suitable compounds having hydrazide groups are, for example, polycarboxylic hydrazides having a molar weight of up to 500 g/mol. Preferred hydrazide compounds are dicarboxylic dihydrazides having preferably 2 to 10 carbon atoms. Examples include oxalic dihydrazide, malonic dihydrazide, succinic dihydrazide, glutaric dihydrazide, adipic dihydrazide, sebacic dihydrazide, maleic dihydrazide, fumaric dihydrazide, itaconic dihydrazide and/ or isophthalic dihydrazide. Particularly preferred are adipic dihydrazide, sebacic dihydrazide and isophthalic dihydrazide. Examples of suitable compounds having amino groups are ethylenediamine, propylenediamine, tetramethylenediamine, pentamethylenediamine, hexamethylenediamine, diethylenetriamine, triethylenetetramine, polyethyleneimines, partly hydrolyzed polyvinylformamides, ethylene oxide and propylene oxide adducts such as the "Jeffamines", cyclohexanediamine and xylylenediamine. The compound having the functional groups may be added to the composition or to the dispersion of the polymer at any point in time. In the aqueous dispersion there is not yet any crosslinking with the keto or aldehyde groups. Crosslinking occurs on the coated substrate only in the course of drying. The amount of the compound having the functional groups is preferably measured such that the molar ratio of the functional groups to the keto and/or aldehyde groups of the polymer is 1:10 to 10:1, especially 1:5 to 5:1, particularly preferably 1:2 to 2:1 and very particularly preferably 1:1.3 to 1.3:1. Especially preferred are equimolar amounts of the functional groups and of the keto and/or aldehyde groups.

The adhesive polymer dispersed in the aqueous phase is preferably a styrene/acrylate copolymer formed from a monomer mixture comprising styrene and at least one monomer selected from C1- to C20-alkyl acrylates and C1- to C20-alkyl methacrylates, for example a monomer mixture comprising or consisting of 40% to 70% by weight of at least one C2- to C8-alkyl acrylate (preferably butyl acrylate or ethylhexyl acrylate), 25% to 55% by weight of styrene and 0.5% to 5% by weight of acid monomers.

Also preferred as adhesive polymers dispersed in the aqueous phase are acrylate polymers formed from a monomer mixture comprising or consisting of 75% to 90% by weight of at least one C2- to C8-alkyl acrylate (preferably ethyl acrylate, butyl acrylate or ethylhexyl acrylate), 5% to 20% by weight of methyl (meth)acrylate and 0.5% to 5% by weight of acid monomers.

The monomers of the polymerization are preferably selected such that the measured glass transition temperature of the adhesive polymer is in the range from −40° C. to +15° C., in particular from −35° C. to +10° C. or from −10° C. to +10° C. Through targeted variation of monomer type and quantity, those skilled in the art are able according to the invention to produce aqueous polymer compositions whose polymers have a glass transition temperature in the desired range. Orientation is possible using the Fox equation. According to Fox (T. G. Fox, Bull. Am. Phys. Soc. 1956 [Ser. II] 1, page 123 and according to Ullmann's Encyclopedia of Industrial Chemistry, vol. 19, page 18, 4th edition, Verlag Chemie, Weinheim, 1980), the glass transition temperature of copolymers is given to a good approximation by:

$$1/T_g = x^1/T_g^1 + x^2/T_g^2 + \ldots x^n/T_g^n,$$

wherein $x^1, x^2, \ldots x^n$ are the mass fractions of the monomers $1, 2, \ldots n$ and $T_g^1, T_g^2, \ldots T_g^n$ are the glass transition temperatures in degrees kelvin of the polymers constructed from only one of the monomers $1, 2, \ldots n$ at a time. The $T_g$ values for the homopolymers of the majority of monomers are known and are listed for example in Ullmann's Encyclopedia of Industrial Chemistry, vol. 5, vol. A21, page 169, VCH Weinheim, 1992; further sources for glass transition temperatures of homopolymers are, for example, J. Brandrup, E. H. Immergut, Polymer Handbook, $1^{st}$ Ed., J. Wiley, New York 1966, $2^{nd}$ Ed. J. Wiley, New York 1975, and $3^{rd}$ Ed. J. Wiley, New York 1989.

In one embodiment of the invention the free-radical polymerization employs at least one chain transfer agent. This makes it possible to reduce the molar mass of the emulsion polymer through a chain termination reaction. The chain transfer agents are bonded to the polymer in this procedure, generally to the chain end. The amount of the chain transfer agents is especially 0.05 to 4 parts by weight, particularly preferably 0.05 to 0.8 parts by weight and very particularly preferably 0.1 to 0.6 parts by weight, based on 100 parts by weight of the monomers to be polymerized. Suitable chain transfer agents are, for example, compounds having a thiol group such as tert-butyl mercaptan, thioglycolic acid ethylacryl ester, mercaptoethanol, mercaptopropyltrimethoxysilane or tert-dodecyl mercaptan. The chain transfer agents are generally compounds of low molecular mass, having a molar weight of less than 2000, in particularly less than 1000 g/mol. Preferred are 2-ethylhexyl thioglycolate (EHTG), isooctyl 3-mercaptopropionate (IOMPA) and tert-dodecyl mercaptan (tDMK).

The polymerization may be carried out with seed control, i.e. in the presence of polymer seed (seed latex). Seed latex is an aqueous dispersion of finely divided polymer particles having an average particle diameter of preferably 20 to 40 nm. Seed latex is used in an amount of preferably 0.01 to 0.5 parts by weight, particularly preferably of 0.03 to 0.3 parts by weight, or of 0.03 to not more than 0.1 parts by weight based on 100 parts by weight of monomers. A latex based on polystyrene or based on polymethyl methacrylate is suitable for example. One preferred seed latex is polystyrene seed.

The emulsion polymerization comprises polymerizing ethylenically unsaturated compounds (monomers) in water using usually ionic and/or nonionic emulsifiers and/or protective colloids or stabilizers as surface-active compounds to stabilize the monomer droplets and the polymer particles subsequently formed from the monomers. The surface-active substances are typically used in amounts of 0.1 to 10 parts by weight, preferably 0.2 to 5 parts by weight, based on 100 parts by weight of the monomers to be polymerized.

A detailed description of suitable protective colloids can be found in Houben-Weyl, Methoden der organischen Chemie [Methods of Organic Chemistry], volume XIV/1, Makromolekulare Stoffe [Macromolecular Materials], Georg-Thieme-Verlag, Stuttgart, 1961, p. 411 to 420. Useful emulsifiers include anionic, cationic and also nonionic emulsifiers. As surface-active substances it is preferable to employ emulsifiers whose molecular weight is typically below 2000 g/mol in contrast with the protective colloids. When mixtures of surface-active substances are used, the individual components must of course be compatible with one another; in case of doubt, this may be checked on the basis of a few preliminary experiments. Preference is given to using anionic and nonionic emulsifiers as surface-active substances. Customary accompanying emulsifiers are for example ethoxylated fatty alcohols (EO degree: 3 to 50, alkyl radical: $C_8$ to $C_{36}$), ethoxylated mono-, di- and trialkylphenols (EO degree: 3 to 50, alkyl radical: $C_4$ to $C_9$), alkali metal salts of dialkyl esters of sulfosuccinic acid and alkali metal and ammonium salts of alkyl sulfates (alkyl radical: $C_8$ to $C_{12}$), of ethoxylated alkanols (EO degree: 4 to 30, alkyl radical: $C_{12}$ to $C_{18}$), of ethoxylated alkylphenols (EO degree: 3 to 50, alkyl radical: $C_4$ to $C_9$), of alkylsulfonic acids (alkyl radical: $C_{12}$ to $C_{18}$) and of alkylarylsulfonic acids (alkyl radical: $C_9$ to $C_{18}$).

Further suitable emulsifiers are compounds of the general formula

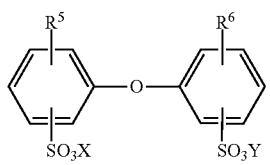

wherein R5 and R6 are hydrogen or C4- to C14-alkyl and are not simultaneously hydrogen, and X and Y may be alkali metal ions and/or ammonium ions. R5 and R6 are preferably linear or branched alkyl radicals having 6 to 18 carbon atoms or hydrogen and in particular having 6, 12 and 16 carbon atoms, wherein R5 and R6 are not both simultaneously hydrogen. X and Y are preferably sodium, potassium or ammonium ions, wherein sodium is particularly preferred. Compounds in which X and Y are sodium, R5 is a branched alkyl radical having 12 carbon atoms and R6 is hydrogen or R5 are particularly advantageous. Often employed are industrial mixtures comprising a proportion of 50% to 90% by weight of the monoalkylated product. Commercially available products of suitable emulsifiers are for example Dowfax®2 A1, Emulan® NP 50, Dextrol® OC 50, Emulgator 825, Emulgator 825 S, Emulan® OG, Texapon® NSO, Nekanil® 904 S, Lumiten® I-RA, Lumiten® E 3065, Disponil® FES 77, Lutensol® AT 18, Steinapol® VSL, Emulphor® NPS 25. Ionic emulsifiers or protective colloids are preferred for the present invention. Particular preference is given to ionic emulsifiers, in particular salts and acids, such as carboxylic acids, sulfonic acids and sulfates, sulfonates or carboxylates. Also employable in particular are mixtures of ionic and nonionic emulsifiers.

The emulsion polymerization may be initiated using water-soluble initiators. Water-soluble initiators are for example ammonium salts and alkali metal salts of peroxodisulfuric acid, for example sodium peroxodisulfate, hydrogen peroxide or organic peroxides, for example tert-butyl hydroperoxide. Also suitable as initiators are so-called reduction-oxidation (redox) initiator systems. Redox initiator systems consist of at least one generally inorganic reducing agent and an inorganic or organic oxidizing agent. The oxidant component is for example the emulsion polymerization initiators previously recited hereinabove. The reductant components are for example alkali metal salts of sulfurous acid, such as for example sodium sulfite, sodium hydrogensulfite, alkali metal salts of disulfurous acid such as sodium disulfite, bisulfite addition compounds of aliphatic aldehydes and ketones, such as acetone bisulfite or reducing agents such as hydroxymethanesulfinic acid and the salts thereof, or ascorbic acid. The redox initiator systems may be employed with co-use of soluble metal compounds whose metallic component may appear in a plurality of valence states. Typical redox initiator systems are, for example, ascorbic acid/iron(II) sulfate/sodium peroxydisulfate, tert-butyl hydroperoxide/sodium disulfite, tert-butyl hydroperoxide/sodium hydroxymethanesulfinic acid. The individual components, for example the reductant component, may also be mixtures, for example a mixture of the sodium salt of hydroxymethanesulfinic acid and sodium disulfite.

The recited initiators are generally employed in the form of aqueous solutions, the lower concentration limit being determined by the amount of water acceptable in the dispersion and the upper concentration limit being determined by the solubility in water of the particular compound. The concentration of the initiators is generally 0.1% to 30% by weight, preferably 0.5% to 20% by weight, particularly preferably 1.0% to 10% by weight, based on the monomers to be polymerized. It is also possible to use two or more different initiators in the emulsion polymerization.

The emulsion polymerization is preferably carried out at 30° C. to 130° C., preferably at 50° C. to 90° C. The polymerization medium may consist either only of water or of mixtures of water and liquids miscible therewith such as methanol. Preference is given to using solely water. The emulsion polymerization may be carried out in the form of a feed process, including staged or gradient process modes. In the polymerization a polymer seed may be initially charged for more effective adjustment of particle size.

The manner in which the initiator is added to the polymerization vessel over the course of the free-radical aqueous emulsion polymerization is known to those of ordinary skill in the art. It may be either initially charged to the polymerization vessel in its entirety or employed continuously or in a staged manner at the rate of its consumption over the course of the free-radical aqueous emulsion polymerization. This specifically depends on the chemical nature of the initiator system and on the polymerization temperature. Preference is given to initially charging a portion and supplying the remainder to the polymerization zone at the rate of its consumption. In order to remove the residual monomers, it is common after the end of the emulsion polymerization proper, i.e. after a monomer conversion of at least 95%, to add initiator as well. In the feed process, the individual components may be added to the reactor from above, from the side or from below through the reactor floor.

The emulsion polymerization generally affords aqueous dispersions of the polymer having solids contents of from 15% to 75% by weight, preferably from 40% to 60% by weight, particularly preferably not less than 50% by weight.

The polymer thus produced is preferably used in the form of its aqueous dispersion. The size distribution of the dispersion particles may be monomodal, bimodal or polymodal and is preferably monomodal. The average particle diameter of the polymer particles dispersed in the aqueous dispersion is preferably greater than 200 nm, preferably greater than 250 nm, for example from 200 nm to 400 nm or from 250 nm to 350 nm. Average particle diameters $x_{PCS}$ and particle size distribution are measured by photon correlation spectroscopy (ISO standard 13321:1996). The size distribution of the dispersion particles is monomodal when measurement of the particle size distribution contains only one single maximum.

The preferred dispersion of the adhesive polymer is an aqueous polymer dispersion comprising water-dispersed polymer particles having an average particle diameter of greater than 200 nm, preferably greater than 250 nm, wherein the polymer particles have a monomodal particle size distribution and a uniform glass transition temperature, produced by free-radical emulsion polymerization of a single monomer mixture (i.e. by single-stage production) comprising ethylenically unsaturated, free-radically polymerizable monomers, using a polymer seed, less than 0.8 parts by weight, preferably not more than 0.5 parts by weight, of emulsifier, based on 100 parts by weight of monomers, without addition of protective colloids and without formation of protective colloids in situ, wherein the monomer mixture consists of a) at least 60% by weight, based on the total amount of monomers, of at least one monomer selected from the group consisting of C1- to C20-alkyl acrylates, C1- to C20-alkyl methacrylates, vinyl esters of carboxylic acids comprising up to 20 carbon atoms, vinylaromatics having up to 20 carbon atoms, vinyl halides, vinyl ethers of alcohols comprising 1 to 10 carbon atoms, aliphatic hydrocarbons having 2 to 8 carbon atoms and one or two double bonds, and mixtures of these monomers, b) at least 0.1% by weight, based on the total amount of monomers, of at least one monomer having at least one acid group;

c) optionally at least one further monomer distinct from the monomers a) and b);

wherein the feeding of the monomer mixture is carried out during the polymerization at a first feed rate and at at least one second feed rate, wherein the first feed rate is preferably slower than the second feed rate and wherein the acid groups of the monomers b) are fully or partially neutralized by feeding of a base during the emulsion polymerization, wherein the feeding of the base commences during the emulsion polymerization once at least 5% by weight, preferably 10% to 70% by weight, of the total monomer mixture is present in the reaction vessel under polymerization conditions. Particle diameters and particle size distribution are measured by photon correlation spectroscopy (ISO standard 13321:1996).

The principle of production of this preferred polymer dispersion is based on the seed-controlled formation of uniform, large polymer particles in aqueous dispersion while largely avoiding the formation of water-soluble oligomers and polymers. This polymerization is preferably carried out in emulsifier-free or low-emulsifier fashion in the sense that less than 0.8, preferably not more than 0.5, parts by weight of emulsifier, based on 100 parts by weight of monomers, are added to stabilize the polymer dispersion according to the invention. Emulsifiers are nonpolymeric, amphiphilic, surface-active substances that are added to the polymerization mixture before or after the polymerization. Small amounts of emulsifiers, originating for example from the use of emulsifier-stabilized polymer seed, are harmless here. It is preferable to employ altogether less than 0.3 parts by weight or less than 0.2 parts by weight of emulsifier, for example from 0.05 to 0.8 parts by weight or from 0.05 to 0.5 parts by weight or from 0.05 to 0.3 parts by weight, based on 100 parts by weight of monomers or no emulsifier. The polymer dispersion formed is preferably stabilized by the special process mode. Said mode is based on a slow initial monomer feed in the presence of a very small amount of polymer seed (seed control) followed by the neutralization of employed acid monomers in the course of the polymerization.

The polymerization is preferably carried out in this case without addition of protective colloids and without formation of protective colloids in situ. Protective colloids are polymeric compounds which upon solvation bind large quantities of water and are capable of stabilizing dispersions of water-insoluble polymers. In contrast to emulsifiers, they generally do not lower the interfacial surface tension between polymer particles and water. The number-average molecular weight of protective colloids is above 1000 g/mol for example.

The acid groups of the monomer b) are preferably not yet neutralized at commencement of the polymerization. They are preferably fully or partially neutralized by feeding of a base only during the emulsion polymerization, wherein the feeding of the base commences during the emulsion polymerization (i.e. after commencement of the polymerization reaction) once at least 5% by weight, preferably 10% to 70% by weight, of the overall monomer mixture is present in the reaction vessel under polymerization conditions. The neutralizing agent may be added for example in a separate feed simultaneously with the feeding of the monomer mixture. After feeding of all of the monomers the polymerization vessel preferably contains the amount of neutralizing agent required for neutralizing at least 10%, preferably 10% to 100% or 25% to 90%, of acid equivalents.

Suitable bases are, for example, sodium hydroxide solution, potassium hydroxide solution, ammonia or organic amines, preferably tertiary amines, in particular trialkylamines preferably having 1 to 4 carbon atoms in the alkyl group, such as for example triethylamine.

The polymerization is preferably carried out with seed control, i.e. in the presence of polymer seed (seed latex). Seed latex is an aqueous dispersion of finely divided polymer particles having an average particle diameter of preferably 20 to 40 nm. Seed latex is used in an amount of preferably 0.01 to 0.5 parts by weight, particularly preferably of 0.03 to 0.3 parts by weight, or of 0.03 to not more than 0.1 parts by weight based on 100 parts by weight of monomers. A latex based on polystyrene or based on polymethyl methacrylate is suitable for example. One preferred seed latex is polystyrene seed.

The addition of the monomer mixture is preferably carried out after commencement of the polymerization reaction by feeding the monomer mixture at a first feed rate and at at least one second feed rate, wherein the first feed rate may be slower than the second feed rate. It is preferable when the first feed rate is slower than the second feed rate. For example, the (average) feed rate is increased by a factor of 2 to 10 after 3% to 30% by weight, preferably 5% to 20% by weight, of the total monomer mixture has been added. The feed rate in this case may be increased in one or more stages or continuously.

The dispersion adhesive composition may be employed as a one-component composition, i.e. without additional crosslinking agents, in particular without isocyanate crosslinkers. However, the dispersion adhesive composition may also comprise a crosslinkable adhesive polymer dispersed in the aqueous phase and at least one reactive crosslinker. Said composition is then preferably a two-component adhesive where a crosslinking component, such as for example an isocyanate, preferably a water-emulsifiable isocyanate, is added.

Polyurethanes may also be employed as the adhesive polymer. Suitable polyurethane dispersions are in principle obtainable by reaction of at least one polyisocyanate with at least one compound having at least two isocyanate-reactive groups and dispersion in water. Suitable polyurethanes also include so-called polyurethane-polyureas comprising not only polyurethane groups but also urea groups. The polyurethane dispersion preferably comprises at least one polyurethane which comprises at least one polyisocyanate and at least one polymeric polyol in copolymerized form. The polyurethane may in particular be formed from at least one polyisocyanate and at least one polymeric polyol. Suitable polymeric polyols are preferably selected from polyester diols, polyether diols, polycarbonate diols and mixtures thereof. The polymeric polyol preferably has a number-average molecular weight in the range from about 500 to 5000 g/mol. Polymeric diols are preferred. The polyurethane dispersion preferably comprises at least one polyurethane which comprises at least one polyisocyanate and a diol component in copolymerized form, of which a) 10-100 mol % based on the total amount of the diols have a molecular weight of 500 to 5000 g/mol and b) 0-90 mol % based on the total amount of the diols have a molecular weight of 60 to 500 g/mol.

The polyurethane is preferably constructed to an extent of at least 40% by weight, particularly preferably to an extent of at least 60% by weight and very particularly preferably to an extent of at least 80% by weight, based on the total weight of the monomers used for producing the polyurethane, from at least one diisocyanate and at least one polyether diol and/or polyester diol. Suitable further synthesis components to 100% by weight include for example the polyisocyanates recited below having at least three NCO groups and compounds distinct from the polymeric polyols having at least two isocyanate-reactive groups. These include for example diols; diamines; polymers distinct from polymeric polyols having at least two active hydrogen atoms per molecule; compounds having two active hydrogen atoms and at least one ionogenic/ionic group per molecule; and mixtures thereof.

The polyurethane preferably has a softening point or melting point in the range from −50° C. to 150° C., particularly preferably from 0° C. to 100° C. and very particularly preferably from 10° C. to 90° C. It is particularly preferable when the polyurethane has a melting point in the above-mentioned temperature range.

Preferred polyurethanes are constructed from:
a) at least one monomeric diisocyanate,
b) at least one diol, wherein the component (b) comprises at least one diol having a number-average molecular weight in the range from 500 to 5000 g/mol,
c) at least one monomer distinct from the monomers (a) and (b) having at least one isocyanate group or at least one isocyanate-reactive group which further bears at least one hydrophilic group or a potentially hydrophilic group,
d) optionally at least one further compound distinct from the monomers (a) to (c) having at least two reactive groups selected from alcoholic hydroxyl groups, primary or secondary amino groups or isocyanate groups, and
e) optionally at least one monofunctional compound distinct from the monomers (a) to (d) having a reactive group which is an alcoholic hydroxyl group, a primary or secondary amino group or an isocyanate group.

The component b) is preferably composed of
$b_1$) 10 to 100 mol %, based on the total amount of component b), of diols having a molecular weight of 500 to 5000 g/mol,
$b_2$) 0 to 90 mol %, based on the total amount of component b), of diols having a molecular weight of 60 to less than 500 g/mol.

It is particularly preferable when the ratio of the diols $b_1$) to the monomers $b_2$) is 0.1:1 to 5:1, particularly preferably 0.2:1 to 2:1. The diol b) is in particular selected from polytetrahydrofuran, polypropylene oxide and polyesterdiols selected from reaction products of dihydric alcohols with dibasic carboxylic acids and lactone-based polyesterdiols.

Compounds suitable as monomers (a) include in particular diisocyanates $X(NCO)_2$, wherein X is an acyclic aliphatic hydrocarbon radical having 4 to 15 carbon atoms, a cycloaliphatic or aromatic hydrocarbon radical having 6 to 15 carbon atoms or an araliphatic hydrocarbon radical having 7 to 15 carbon atoms. Examples of such diisocyanates are tetramethylene diisocyanate, hexamethylene diisocyanate, dodecamethylene diisocyanate, 1,4-diisocyanatocyclohexane, 1-isocyanato-3,5,5-trimethyl-5-isocyanatomethylcyclohexane (IPDI), 2,2-bis(4-isocyanatocyclohexyl)propane, trimethylhexane diisocyanate, 1,4-diisocyanatobenzene, 2,4-diisocyanatotoluene, 2,6-diisocyanatotoluene, 4,4'-diisocyanatodiphenylmethane, 2,4'-diisocyanatodiphenylmethane, p-xylylene diisocyanate, tetramethylxylylene diisocyanate (TMXDI), the isomers of bis(4-isocyanatocyclohexyl)methane (HMDI), such as the trans/trans, the cis/cis and the cis/trans isomers, and mixtures composed of these compounds.

Such diisocyanates are commercially available. Mixtures of these isocyanates of particular importance are the mixtures of the respective structural isomers of diisocyanatotoluene and diisocyanatodiphenylmethane, the mixture of 80 mol % of 2,4-diisocyanatotoluene and 20 mol % of 2,6-diisocyanatotoluene being particularly suitable and preferred. In addition, the mixtures of aromatic isocyanates such as 2,4-diisocyanatotoluene and/or 2,6-diisocyanatotoluene with aliphatic or cycloaliphatic isocyanates, such as hexamethylene diisocyanate or IPDI, are particularly advantageous, the preferred quantitative ratio of the aliphatic isocyanates to aromatic isocyanates being 1:9 to 9:1, in particular 4:1 to 1:4.

The diols (b1) may be polyester polyols and these are known for example from Ullmann's Encyclopedia of Industrial Chemistry, 4th edition, volume 19, pp. 62 to 65. Preference is given to using polyester polyols obtained by reaction of dihydric alcohols with dibasic carboxylic acids. Instead of using the free polycarboxylic acids, the polyester polyols may also be produced using the corresponding polycarboxylic anhydrides or corresponding polycarboxylic esters of lower alcohols or mixtures thereof. The polycarboxylic acids may be aliphatic, cycloaliphatic, araliphatic, aromatic or heterocyclic and may optionally be substituted, for example by halogen atoms, and/or unsaturated. Examples thereof include: suberic acid, azelaic acid, phthalic acid, isophthalic acid, phthalic anhydride, tetrahydrophthalic anhydride, hexahydrophthalic anhydride, tetrachlorophthalic anhydride, endomethylenetetrahydrophthalic anhydride, glutaric anhydride, maleic acid, maleic anhydride, fumaric acid, dimeric fatty acids. Preference is given to dicarboxylic acids of the general formula HOOC—$(CH_2)_y$—COOH, wherein y is a number from 1 to 20, preferably an even number from 2 to 20, for example succinic acid, adipic acid, sebacic acid and dodecanedicarboxylic acid. Suitable dihydric alcohols are, for example, ethylene glycol, propane-1,2-diol, propane-1,3-diol, butane-1,3-diol, butene-1,4-diol, butyne-1,4-diol, pentane-1,5-diol, neopentyl glycol, bis(hydroxymethyl)cyclohexanes such as 1,4-bis(hydroxymethyl)cyclohexane, 2-methylpropane-1,3-diol, methylpentanediols, furthermore diethylene glycol, triethylene glycol, tetraethylene glycol, polyethylene glycol, dipropylene glycol, polypropylene glycol, dibutylene glycol and polybutylene glycols. Preferred alcohols are those of the general formula HO—$(CH_2)_x$—OH, wherein x is a number from 1 to 20, preferably an even number from 2 to 20. Examples thereof are ethylene glycol, butane-1,4-diol, hexane-1,6-diol, octane-1,8-diol and dodecane-1,12-diol. Neopentyl glycol is also preferred.

The diols (b1) may also be polycarbonate diols such as are obtainable for example by reaction of phosgene with an excess of the low molecular weight alcohols recited as synthesis components for the polyester polyols.

The diols (b1) may also be actone-based polyester diols, specifically homopolymers or copolymers of lactones, preferably terminal hydroxyl-comprising addition products of lactones onto suitable difunctional starter molecules. Contemplated lactones preferably include those derived from compounds of the general formula HO—$(CH_2)_z$—COOH, wherein z is a number from 1 to 20 and one hydrogen atom of a methylene unit may also be substituted by a $C_1$- to $C_4$-alkyl radical. Examples include epsilon-caprolactone, beta-propiolactone, gamma-butyrolactone and/or methyl-gamma-caprolactone and mixtures thereof. Suitable starter components are, for example, the low-molecular weight-dihydric alcohols recited hereinabove as synthesis components for the polyester polyols. The corresponding polymers of epsilon-caprolactone are particularly preferred. Lower polyester diols or polyether diols may also be employed as starters for producing the lactone polymers. Instead of the polymers of lactones, the corresponding, chemically equivalent polycondensates of the hydroxycarboxylic acids corresponding to the lactones may also be employed.

The diols (b1) may also be polyether diols. Polyether diols are obtainable in particular by homopolymerization of ethylene oxide, propylene oxide, butylene oxide, tetrahydrofuran, styrene oxide or epichlorohydrin, for example in the presence of $BF_3$, or by addition of these compounds optionally in admixture or in succession onto starting components having reactive hydrogen atoms, such as alcohols or amines, for example water, ethylene glycol, propane-1,2-diol, propane-1,3-diol, 2,2-bis(4-hydroxyphenyl)propane or aniline. Polyether diols having a molecular weight of 500 to 5000 and especially 600 to 4500 are particularly preferred. Particularly preferred polyether diols are polypropylene oxide and polytetrahydrofuran. Suitable polytetrahydrofurans may be produced by cationic polymerization of tetrahydrofuran in the presence of acidic catalysts, such as for example sulfuric acid or fluorosulfuric acid. Such methods of production are known to those skilled in the art. Suitable compounds b1) further include alpha,omega-diaminopolyethers producible by amination of polyalkylene oxides with ammonia.

$b_1$) only includes polyether diols formed to an extent of less than 20% by weight, based on their total weight, of ethylene oxide. Polyether diols comprising at least 20% by weight of incorporated ethylene oxide units are hydrophilic polyether diols that are included among the monomers c).

Optionally co-usable as monomers $b_1$) are also polyhydroxyolefins, preferably those having 2 terminal hydroxyl groups, for example alpha-omega-dihydroxypolybutadiene, alpha-omega-dihydroxypolymethacrylate esters or alpha-omega-dihydroxypolyacrylate esters as monomers. Such compounds are disclosed in EP-A 622 378 for example. Further suitable polyols are polyacetals, polysiloxanes and alkyd resins.

It is preferable when at least 95 mol % of the diols $b_1$) are polyester diols and/or polytetrahydrofuran. It is particularly preferable to employ exclusively polyesterdiols and/or polytetrahydrofuran as diols $b_1$).

The hardness and the modulus of elasticity of the polyurethanes can be increased when as diols (b) not only the diols $b_1$) but also low-molecular-weight diols $b_2$) having a molecular weight of about 60 to 500, preferably of 62 to 200 g/ml, are employed. Employed monomers $b_2$) especially include the synthesis components of the short-chain alkanediols recited for the production of polyester polyols, wherein the unbranched diols having 2 to 12 carbon atoms and an even number of carbon atoms and also pentane-1,5-diol and neopentyl glycol are preferred. Contemplated diols $b_2$) include for example ethylene glycol, propane-1,2-diol, propane-1,3-diol, butane-1,3-diol, butene-1,4-diol, butyne-1,4-diol, pentane-1,5-diol, neopentyl glycol, bis(hydroxymethyl)cyclohexanes such as 1,4-bis(hydroxymethyl) cyclohexane, 2-methylpropane-1,3-diol, methylpentanediols, furthermore diethylene glycol, triethylene glycol, tetraethylene glycol, polyethylene glycol, dipropylene glycol, polypropylene glycol, dibutylene glycol and polybutylene glycols. Preferred alcohols are those of the general formula $HO-(CH_2)_x-OH$, wherein x is a number from 1 to 20, preferably an even number from 2 to 20. Examples thereof are ethylene glycol, butane-1,4-diol, hexane-1,6-diol, octane-1,8-diol and dodecane-1,12-diol. Neopentyl glycol is also preferred.

In order to ensure that the polyurethanes are water-dispersible, the polyurethanes comprise as a synthesis component monomers (c) which are distinct from the components (a) and (b) and bear at least one isocyanate group or at least one isocyanate-reactive group and moreover bear at least one hydrophilic group or a group which can be converted into a hydrophilic group. Hereinbelow, the term "hydrophilic groups or potentially hydrophilic groups" is abbreviated to "(potentially) hydrophilic groups". The (potentially) hydrophilic groups react with isocyanates substantially more slowly than the functional groups of the monomers used to construct the polymer main chain. The proportion of components comprising (potentially) hydrophilic groups in the total amount of components (a) to (f) is generally measured such that the molar amount of the (potentially) hydrophilic groups (preferably anionic or potentially anionic groups) based on the amount by weight of all monomers (a) to (e) is 30 to 1000, preferably 50 to 500 and particularly preferably 80 to 300 mmol/kg. The (potentially) hydrophilic groups may be nonionic or preferably (potentially) ionic hydrophilic groups.

Contemplated nonionic hydrophilic groups include in particular polyethylene glycol ethers composed of preferably 5 to 100, preferably 10 to 80, ethylene oxide repeating units. The content of polyethylene oxide units is generally 0% to 10% by weight, preferably 0% to 6% by weight, based on the amount by weight of all monomers (a) to (e). Preferred monomers comprising nonionic hydrophilic groups are polyethylene oxide diols comprising at least 20% by weight of ethylene oxide, polyethylene oxide monools and the reaction products of a polyethylene glycol and a diisocyanate which bear a terminally etherified polyethylene glycol radical. Such diisocyanates and processes for their production are recited in patent documents U.S. Pat. Nos. 3,905,929 and 3,920,598.

Ionic hydrophilic groups are especially anionic groups, such as the sulfonate, carboxylate and the phosphate group in the form of their alkali metal or ammonium salts, and cationic groups, such as ammonium groups, in particular protonated tertiary amino groups or quaternary ammonium groups. Potentially ionic hydrophilic groups are especially those which may be converted into the abovementioned ionic hydrophilic groups by simple neutralization, hydrolysis or quaternization reactions, i.e. carboxylic acid groups or tertiary amino groups for example. (Potentially) ionic monomers (c) are described in detail for example in Ullmann's Encyclopedia of Industrial Chemistry, 4th edition, volume 19, pp. 311-313 and for example in DE-A 1 495 745.

(Potentially) cationic monomers (c) of particular practical importance are especially monomers comprising tertiary amino groups, for example: tris(hydroxyalkyl)amines, N,N'-bis(hydroxyalkyl)alkylamines, N-hydroxyalkyldialkylamines, tris(aminoalkyl)amines, N,N'-bis(aminoalkyl)alkylamines, N-aminoalkyldialkylamines, wherein the alkyl radicals and alkanediyl units of these tertiary amines are independently of one another composed of 1 to 6 carbon atoms. Also contemplated are polyethers comprising tertiary nitrogen atoms and preferably two terminal hydroxyl groups, such as are obtainable in a manner customary per se for example by alkoxylation of amines comprising two hydrogen atoms attached to amine nitrogen, for example methylamine, aniline or N,N'-dimethylhydrazine. Such polyethers generally have a molar weight of between 500 and 6000 g/mol. These tertiary amines are converted into the ammonium salts either with acids, preferably strong mineral acids such as phosphoric acid, sulfuric acid, hydrohalic acids, or strong organic acids or by conversion with suitable quaternization agents such as $C_1$- to $C_6$-alkyl halides or benzyl halides, for example bromides or chlorides.

Contemplated monomers comprising (potentially) anionic groups typically include aliphatic, cycloaliphatic, araliphatic or aromatic carboxylic acids and sulfonic acids bearing at least one alcoholic hydroxyl group or at least one primary or secondary amino group. Preference is given to dihydroxyalkylcarboxylic acids, especially comprising 3 to 10 carbon atoms, as also described in U.S. Pat. No. 3,412,054. Preferred compounds include in particular compounds of the general formula ($c_1$)

in which $R^1$ and $R^2$ represent a $C_1$- to $C_4$-alkanediyl (unit) and $R^3$ represents a $C_1$- to $C_4$-alkyl (unit), especially dimethylolpropionic acid (DMPA). Corresponding dihydroxysulfonic acids and dihydroxyphosphonic acids such as 2,3-dihydroxypropanephosphonic acid are also suitable. Also suitable are dihydroxy compounds having a molecular weight of more than 500 to 10 000 g/mol and comprising at least 2 carboxylate groups, as disclosed in DE-A 39 11 827. These are obtainable by reacting dihydroxy compounds with tetracarboxylic dianhydrides, such as pyro-mellitic dianhydride or cyclopentanetetracarboxylic dianhydride in a molar ratio of 2:1 to 1.05:1 in a polyaddition reaction. Suitable dihydroxy compounds are in particular the monomers (b2) cited as chain extenders and the diols (b1).

Contemplated monomers (c) comprising isocyanate-reactive amino groups also include aminocarboxylic acids such as lysine, beta-alanine or the adducts, cited in DE-A 20 34 479, of aliphatic diprimary diamines onto alpha,beta-unsaturated carboxylic or sulfonic acids. Such compounds for example conform to the formula ($c_2$)

in which $R^4$ and $R^5$ independently of one another represent a $C_1$- to $C_6$-alkanediyl unit, preferably ethylene; and X represents COOH or $SO_3H$. Particularly preferred compounds of formula ($c_2$) are N-(2-aminoethyl)-2-aminoethanecarboxylic acid and N-(2-aminoethyl)-2-aminoethanesulfonic acid and the corresponding alkali metal salts, wherein sodium is a particularly preferred counterion. Also particularly preferred are the adducts of the abovementioned aliphatic diprimary diamines onto 2-acrylamido-2-methylpropanesulfonic acid, as described for example in DE-B 1 954 090.

Where monomers containing potentially ionic groups are employed, their conversion into the ionic form may take place before, during, but preferably after the isocyanate polyaddition, since the solubility of the ionic monomers in the reaction mixture is frequently no more than poor. Neutralizing agents are for example ammonia, NaOH, triethanolamine (TEA), triisopropylamine (TIPA) or morpholine, and derivatives thereof. The sulfonate or carboxylate groups are especially preferably present in the form of their salts with an alkali metal ion or with an ammonium ion as the counterion.

The monomers (d) which are distinct from the monomers (a) to (c) and which are optionally also constituents of the polyurethane are generally used for crosslinking or chain extension. They are generally more than dihydric nonphenolic alcohols, amines comprising 2 or more primary and/or secondary amino groups and compounds bearing one or more primary and/or secondary amino groups in addition to one or more alcoholic hydroxyl groups. Alcohols having a hydricity greater than 2 and which may be used to establish a certain degree of branching or crosslinking are, for example, trimethylolpropane, glycerol and sugar.

Also contemplated are monoalcohols which carry not only the hydroxyl group but also a further isocyanate-reactive group such as monoalcohols having one or more primary and/or secondary amino groups, for example monoethanolamine. Polyamines having 2 or more primary and/or secondary amino groups are primarily used when the chain extension and/or crosslinking is to take place in the presence of water since amines generally react with isocyanates more rapidly than alcohols or water. This is often necessary when aqueous dispersions of crosslinked polyurethanes or polyurethanes of high molecular weight are desired. The procedure in such cases comprises producing prepolymers comprising isocyanate groups, rapidly dispersing said prepolymers in water and subsequently chain-extending or crosslinking said prepolymers by adding compounds comprising a plurality of isocyanate-reactive amino groups.

Amines suitable for this purpose are generally polyfunctional amines in the molecular weight range from 32 to 500 g/mol, preferably from 60 to 300 g/mol, which comprise at least two amino groups selected from the group of the primary and secondary amino groups. Examples thereof are diamines such as diaminoethane, diaminopropanes, diaminobutanes, diaminohexanes, piperazine, 2,5-dimethylpiperazine, amino-3-aminomethyl-3,5,5-trimethylcyclohexane (isophoronediamine, IPDA), 4,4'-diaminodicyclohexylmethane, 1,4-diaminocyclohexane, aminoethylethanolamine, hydrazine, hydrazine hydrate or triamines such as diethylenetriamine or 1,8-diamino-4-aminomethyloctane. The amines may also be employed in blocked form, for example in the form of the corresponding ketimines (see, for example, CA-A 1 129 128), ketazines (cf., for example, U.S. Pat. No. 4,269,748) or amine salts (see U.S. Pat. No. 4,292,226). Oxazolidines, as are used, for example, in U.S. Pat. No. 4,192,937, also represent capped polyamines which can be used for producing the polyurethanes according to the invention for chain extension of the prepolymers. Use of such capped polyamines generally comprises mixing said polyamines with the prepolymers in the absence of water and subsequently mixing this mixture with the dispersion water or a portion of the dispersion water, thus releasing the corresponding polyamines hydrolytically. It is preferable to use mixtures of di- and triamines, particularly preferably mixtures of isophorone diamine (IPDA) and diethylene triamine (DETA).

The polyurethanes preferably comprise 1 to 30 mol %, particularly preferably 4 to 25 mol %, based on the total amount of the components (b) and (d) of a polyamine comprising at least 2 isocyanate-reactive amino groups as monomers (d). Higher than difunctional isocyanates may also be used as monomers (d) for the same purpose. Commercially available compounds are, for example, the isocyanurate or the biuret of hexamethylene diisocyanate.

Monomers (e) that are optionally co-used are monoisocyanates, monoalcohols and monoprimary and -secondary amines. The proportion thereof is generally not more than 10 mol %, based on the total molar amount of the monomers.

These monofunctional compounds typically bear further functional groups such as olefinic groups or carbonyl groups and serve to introduce functional groups into the polyurethane which make the dispersal or crosslinking or further polymer-analogous reaction of the polyurethane possible. Contemplated therefor are monomers such as isopropenyl-a,a'-dimethylbenzyl isocyanate (TMI) and esters of acrylic or methacrylic acid such as hydroxyethyl acrylate or hydroxyethyl methacrylate.

Coatings having a particularly good profile of properties are obtained especially when the monomers (a) employed are substantially only aliphatic diisocyanates, cycloaliphatic diisocyanates or araliphatic diisocyanates. This monomer combination is superbly complemented as component (c) by alkali metal salts of diaminosulfonic acid; very particularly by N-(2-aminoethyl)-2-aminoethanesulfonic acid and its corresponding alkali metal salts, wherein the Na salt is most suitable, and a mixture of DETA and IPDA as component (d).

Also preferred are polyurethanes, wherein
the diisocyanates a) are selected from diisocyanates of the formula $X(NCO)_2$, wherein X represents an acyclic aliphatic hydrocarbon radical having 4 to 15 carbon atoms, a cycloaliphatic hydrocarbon radical having 6 to 15 carbon atoms, an aromatic hydrocarbon radical having 6 to 15 carbon atoms or an araliphatic hydrocarbon radical having 7 to 15 carbon atoms, preferably selected from the group consisting of hexamethylene diisocyanate, 1-isocyanato-3,5,5-trimethyl-5-isocyanatomethylcyclohexane, 2,6-diisocyanatotoluene, 2,4-diisocyanatotoluene and tetramethylxylylene diisocyanate or a mixture thereof;
the diols b1) are selected from polyester diols, polycarbonate diols and polyether diols; and the compound c) is selected from dihydroxycarboxylic acids, diaminocarboxylic acids and diaminosulfonic acids.

The way in which the molecular weight of the polyurethanes may be adjusted through choice of the proportions of the mutually reactive monomers and of the arithmetic mean of the number of reactive functional groups per molecule is common general knowledge in the field of polyurethane chemistry. The components (a) to (e) and their respective molar amounts are normally chosen such that the ratio A:B where A is the molar amount of isocyanate groups and
B is the sum of the molar amount of hydroxyl groups and the molar amount of functional groups which are capable of reacting with isocyanates in an addition reaction, is 0.5:1 to 2:1, preferably 0.8:1 to 1.5:1, particularly preferably 0.9:1 to 1.2:1. It is very particularly preferable when the ratio A:B is very close to 1:1.

The monomers (a) to (e) employed bear on average typically from 1.5 to 2.5, preferably from 1.9 to 2.1 and particularly preferably 2.0 isocyanate groups or functional groups capable of reacting with isocyanates in an addition reaction.

The polyaddition of the components (a) to (e) to produce the polyurethane is preferably carried out at reaction temperatures of up to 180° C., preferably up to 150° C., under standard pressure or under autogenous pressure. The production of polyurethanes and of aqueous polyurethane dispersions is known to those skilled in the art.

In the context of the present invention an aqueous polyurethane dispersion is to be understood as meaning a dispersion which has an aqueous solvent as the continuous phase. Suitable aqueous solvents are water and mixtures of water with water-miscible solvents, for example alcohols, such as methanol, ethanol, n-propanol, isopropanol, n-butanol, sec-butanol, tert-butanol, n-hexanol and cyclohexanol; glycols, such as ethylene glycol, propylene glycol and butylene glycol; the methyl or ethyl ethers of dihydric alcohols, diethylene glycol, triethylene glycol, polyethylene glycols having number-average molecular weights up to about 3000, glycerol and dioxane, and ketones, such as acetone in particular. In one specific embodiment the polyurethane dispersion is substantially free from organic solvents. "Substantially free from organic solvents" is to be understood as meaning that the proportion of organic solvents is not more than 5% by weight, particularly preferably not more than 1% by weight, in particular not more than 0.1% by weight, based on the total weight of the solvent.

In a preferred embodiment the production of the polyurethanes is carried out in the presence of at least one organic solvent. Preferred organic solvents for production of the polyurethanes are ketones, such as acetone and methyl ethyl ketone, and N-methylpyrrolidone. Particular preference is given to using acetone. If an at least partially water-miscible solvent is used to produce the polyurethanes, the polyurethane dispersion according to the invention may contain not only water but also the organic solvent used for production. It will be appreciated that the production of the polyurethane dispersions according to the invention may be carried out in the presence of at least one organic solvent, with said solvent subsequently being partially or completely replaced with water.

The aqueous dispersion adhesive composition comprises at least one polyvinylpyrrolidone (homopolymer of vinylpyrrolidone) dissolved in the aqueous phase. The content of polyvinylpyrrolidone is preferably adjusted such that the viscosity of the total composition at 23° C. is from 10 s to 30 s, particularly preferably from 11 s to 27 s or from 12 s to 26 s or from 13 s to 20 s, measured with DIN flow cup no. 4 according to DIN EN ISO 2431:2011. The content of polyvinylpyrrolidone may be, for example, from 0.02% to 2% by weight, or from 0.04% to 1.6% by weight, particularly preferably from 0.04% to 1.2% by weight, based on the total amount of dispersion adhesive composition.

The polyvinylpyrrolidone preferably has a K value of 25 to 100, particularly preferably 80 to 98, measured at 25° C. as a 1% solution in water.

The pH of the adhesive polymer dispersion is preferably adjusted to a pH greater than 5, in particular to a pH between 5.5 and 8.

Preferred dispersion adhesive compositions have a viscosity of 12 s to 26 s, particularly preferably of 13 s to 20 s at 23° C., measured with DIN flow cup no. 4 according to DIN EN ISO 2431:2011.

Preferred dispersion adhesive compositions have a value of greater than 120 minutes in the Billhöfer foam test (see examples) measured at 250 m/min.

In the process according to the invention the adhesive-coated articles may be selected, for example, from laminates and pressure-sensitive adhesive articles, preferably in processes for bonding large-surface-area substrates. Said articles are preferably composite films, wherein at least two films are bonded to one another using the aqueous dispersion adhesive composition.

For applications in laminating processes the laminating adhesive is preferably non-self-adhesive. Non-self-adhesive adhesives are adhesives which, unlike pressure-sensitive adhesives, have only very little, if any, tack at room temperature and are preferably employed with application of pressure and/or elevated temperature. The tack measured as loop tack is preferably less than 1.7 N/25 mm (adhesive applied at an application thickness of 20 µm to a 12 µm thick polyester film, measured on steel at room temperature (20° C.) at a peeling speed of 300 mm/min).

For applications for producing pressure-sensitive adhesive articles the dispersion adhesive composition has pressure-sensitive properties. A pressure-sensitive adhesive is a viscoelastic adhesive which sets to form a film that at room temperature (20° C.) remains permanently tacky and adhesive in the dry state. Adhesion to substrates is effected immediately by gentle pressure. The loop tack is preferably more than 1.7 N/25 mm, particularly preferably more than 2 N/25 mm (adhesive applied at an application thickness of 20 µm on a 12 µm thick polyester film, measured on steel at room temperature (20° C.) at a peeling speed of 300 mm/min).

The aqueous dispersion adhesive compositions may be employed as such or after formulating with customary auxiliaries. Typical auxiliaries are, for example, fillers, dyes, leveling agents, thickeners, preferably associative thickeners, additional defoamers, crosslinking agents, plasticizers, pigments, light stabilizers, biocides, tackifiers or wetting agents. For better wetting of surfaces the compositions may include in particular wetting auxilliaries (wetting agents), for example fatty alcohol ethoxylates, alkylphenol ethoxylates, nonylphenol ethoxylates, polyoxyethylenes/polyoxypropylenes or sodium dodecylsulfonates. The amount of additives is preferably 0.05 to 5 parts by weight, especially 0.1 to 3 parts by weight, based on 100 parts by weight of polymer (solid). The dispersion adhesive compositions do not necessarily require the addition of additional defoamers since their particular advantage is that they are particularly low-foaming when applied to substrates. The dispersion adhesive composition is therefore preferably free from commonly used defoamers, such as for example free from defoamers based on silicone or free from defoamers based on organic oils.

Especially for the production of pressure-sensitive adhesive articles the dispersion adhesive composition may contain at least one tackifier (tackifying resins) in an amount of preferably 5 to 40 parts by weight, based on 100 parts by weight of adhesive polymer. A tackifier is a polymeric or oligomeric additive for adhesive polymers or generally for elastomers which increases their autoadhesion (tack, inherent tack, self-adhesion) so that after short, light contact pressure they adhere to surfaces firmly. Tackifiers include for example natural resins, such as colophony resins and the derivatives thereof formed by disproportionation or isomerization, polymerization, dimerization or hydrogenation or terpene resins. These may be in their salt form (with for example monovalent or polyvalent counterions (cations)) or preferably in their esterified form. Alcohols used for esterification may be monohydric or polyhydric. Examples include methanol, ethanediol, diethylene glycol, triethylene glycol, 1,2,3-propanethiol, pentaerythritol. Further employable are also hydrocarbon resins, for example coumarone-indene resins, polyterpene resins, hydrocarbon resins based on unsaturated CH compounds, such as butadiene, pentene, methylbutene, isoprene, piperylene, divinylmethane, pentadiene, cyclopentene, cyclopentadiene, cyclohexadiene, styrene, alpha-methylstyrene, vinyltoluene. Tackifiers are known for example from Adhesive Age, July 1987, pages 19-23 or Polym. Mater. Sci. Eng. 61 (1989), pages 588-592. Polyacrylates having a low molar weight are increasingly also being used as tackifiers. These polyacrylates preferably have a weight-average molecular weight $M_w$ less than 50 000, in particular less than 30 000. The polyacrylates preferably consist to an extent of at least 60% by weight, in particular at least 80% by weight, of $C_1$-$C_8$ alkyl (meth)acrylates. Suitable tackifiers include for example the low-molecular-weight polymers and oligomers described in WO 2013/117428 having a weight-average molecular weight of less than 50 000 and a glass transition temperature of not less than −40° C. to not more than 0° C., preferably of not less than −35° C. to not more than 0° C., producible by emulsion polymerization in the presence of at least one molecular weight regulator and producible from a monomer mixture comprising at least 40% by weight of at least one C1- to C20-alkyl (meth)acrylate. Suitable tackifiers may also be produced in situ in the presence of the dispersed adhesive polymer, especially as described in WO 2013/117428.

Preferred tackifiers include natural or chemically modified colophony resins. Colophony resins consist predominantly of abietic acid or abietic acid derivatives. The tackifiers may be added to the polymer dispersion in simple fashion. The tackifiers themselves are preferably in the form of an aqueous dispersion. The amount by weight of the tackifiers is preferably 5 to 100 parts by weight, particularly preferably 10 to 50 parts by weight, based on 100 parts by weight of polymer (solid/solid).

For pressure-sensitive adhesive applications the dispersion adhesive composition preferably comprises
60-95 parts by weight of pressure-sensitive adhesive polymer,
5-40 parts by weight of tackifier and
optionally 0-10 parts by weight of further constituents such as for example the abovementioned wetting agents, thickeners, defoamers, crosslinkers etc.

Application of the aqueous dispersion adhesive compositions on films using a coating machine having at least one rotating roller may employ known coating processes, such as for example roller application, counterrotating roller application, gravure roller application, counterrotating gravure roller application. The web speed of the film substrate is at least 150 m/min, preferably at least 200 m/min, for example from 200 to 400 m/min.

The process for producing composite films comprises bonding at least two films to one another using the aqueous dispersion adhesive composition. The dispersion adhesive composition or a preparation formulated accordingly is preferably applied to the large-surface-area substrates to be bonded at a layer thickness of 0.1 to 20 g/m², particularly preferably 1 to 7 g/m². After a short time for evaporation of the dispersion water (preferably after 1 to 60 seconds) the coated substrate may then be laminated with a second substrate, wherein the temperature may be for example 20° C. to 200° C., preferably 20° C. to 100° C., and the pressure may be for example 100 to 3000 kN/m², preferably 300 to 2000 kN/m².

In the process according to the invention for composite film lamination at least two films are preferably bonded to one another with the aqueous dispersion adhesive composition in such a way that the peel strength (after 24 h, at 23° C./50% rel. humidity) is preferably 2.5 N/15 mm or more or 3 N/15 mm or more or that the films bonded to one another are separable only with destruction of at least one of the films.

In the process according to the invention at least one of the films may be printed or metallized on the side coated with the dispersion adhesive composition. Suitable film substrates are, for example, polymer films, in particular made of thermoplastic polyolefins (TPO) such as polyethylene (PE), polypropylene (PP), for example oriented, preferably biaxially oriented, polypropylene (OPP) or unoriented polypropylene (CPP), ethylene/vinyl acetate copolymers (EVA), ASA (acrylonitrile/styrene/acrylate copolymers), PUR (polyurethane), polyamide (PA), polyester, preferably polyethylene terephthalate (PET), polyvinyl chloride (PVC) especially plasticized PVC, polyacetate, poly(meth)acrylates, polycarbonates or their plastic alloys, cellulose acetate, cellophane, polymer films coated (by vapor deposition) with metal, for example aluminum, (metallized films for short) such as metallized polyolefin films or metallized polyester films for example or metal foils, for example made of tin or aluminum. The film substrate is preferably selected from the group consisting of polyethylene, oriented polypropylene, unoriented polypropylene, polyamide, polyethylene terephthalate, polyacetate, cellophane, metallized films and metal foils. The polymer films, in particular polyolefin films, may optionally have been corona pretreated.

The recited films may be bonded to one another or to a film of another type, for example polymer films to metal foils, different polymer films to one another, etc. The recited films may also have been printed with printing inks for example. The thickness of the film substrates may be for example from 5 to 100 µm, preferably from 5 to 40 µm.

In the case of composite films the material of a first film is selected from OPP, CPP, PE, PET and PA and the material of a second film is selected from OPP, CPP, PE, PET, PA and metal foil for example. In one embodiment of the invention the first film and/or the second film is printed or metallized on the respective side which is coated with the dispersion adhesive composition.

The composite films obtainable according to the invention are suitable especially for the production of flexible packagings, for example for packaging foodstuffs.

Surface treatment of the film substrates before coating with a dispersion adhesive composition is not absolutely necessary. However, better results can be obtained if the surfaces of the film substrates are modified prior to coating. Customary surface treatments may be employed in this case to amplify the adhesive effect, for example primers, plasma treatment or corona treatment. The corona treatment or other surface treatments are carried out to the extent required for sufficient wettability with the coating composition. Customarily, corona treatment of approximately 10 watts per square meter per minute is sufficient for this purpose. Alternatively or in addition it is optionally also possible to use primers or tie coats between film substrate and adhesive coating. Furthermore, other, additional functional layers may be present on the composite films, examples being barrier layers, print layers, color layers or varnish layers, or protective layers. These functional layers may be located externally, i.e. on the side of the film substrate facing away from the adhesive-coated side, or internally, between film substrate and adhesive layer.

Suitable exemplary application weights
for composite film production are:
from 0.1 to 20 g, particularly preferably 1 to 6 g of solid per m$^2$
for other technical laminates are:
from 0.5 to 100 g, preferably from 2 to 80 g, very particularly preferably from 10 to 70 g of solid per m$^2$
for producing pressure-sensitive adhesive articles are:
from 0.1 to 300 g, particularly preferably from 2 to 150 g of solid per m$^2$.

The process may be used to produce self-adhesive articles. The articles are at least partially coated with the pressure-sensitive adhesive. The adhesive properties may be adjusted such that the self-adhesive articles are removable again after bonding. The self-adhesive particles may be adhesive labels, adhesive tapes or adhesive films for example. Suitable carrier materials are for example paper, plastic films and metal foils. The inventive self-adhesive tapes may be tapes of the abovementioned substances coated on one or both sides. Self-adhesive labels may be labels made of paper or a thermoplastic film. Adhesive tapes made of thermoplastic film are particularly preferred. Contemplated thermoplastic films include for example films made of polyolefins (for example polyethylene, polypropylene), polyolefin copolymers, films made of polyesters (for example polyethylene terephthalate), polyvinyl chloride or polyacetate. The surfaces of the thermoplastic polymer films have preferably been corona-treated. The labels have been coated with adhesive on one side. Preferred substrates for the self-adhesive articles are paper and polymer films.

The self-adhesive articles have been at least partially coated with a pressure-sensitive adhesive on at least one surface. Application is generally followed by a drying step for removal of the water/the solvent. The water may be removed by drying at 50° C. to 150° C. for example. The thus obtained, coated substrates are used for example as self-adhesive articles, such as adhesive labels, adhesive tapes or adhesive films. To this end the carriers may be cut into adhesive tapes, adhesive labels or adhesive films before or after application of the adhesive. The side of the substrates coated with pressure-sensitive adhesive may be covered with a release paper, for example with a siliconized paper, for later use. The substrates to which the self-adhesive articles may advantageously be applied may be metal, wood, glass, paper or plastic for example. The self-adhesive articles are especially suitable for bonding to packaging surfaces, cardboard boxes, plastic packaging, books, windows, vapor barriers, motor vehicle bodies, tires or vehicle body parts.

In addition to the composite film lamination the process according to the invention may also be employed in further industrial lamination processes, for example for producing automotive interior parts, for furniture lamination and for glossy film lamination. Contemplated substrates for bonding then include for example those made of wood, metal, plastic, leather, fiber moldings, for example MDF sheets, or paper. In glossy film lamination transparent polymer films are bonded to paper substrates.

When used for surface decoration of a solid carrier with a film substrate coated according to the invention, for example a decorative film, the film substrate coated according to the invention is bonded for example to articles made of wood, including bound wood fiber materials such as fiberboards or other boards made of cellulose materials, metal or plastic. For example furniture or furniture parts are laminated with the coated film substrate or automotive interior parts are coated with the coated film substrate made of PVC or TPO for example. Polyurethane dispersions are particularly suitable as an adhesive for lamination of rigid shaped articles with flexible decorative films.

Particular advantages of the process according to the invention are in particular:
only very little, if any, foaming during coating, even without use of silicone-based or oil-based defoamers
food regulation compliance
no reaction (no viscosity increase) with isocyanate crosslinkers
improved optical properties (for example less, if any, film haze)
rheological properties of the dispersion adhesive composition well suited for mechanical coating
good peel strengths in composite film lamination

EXAMPLES

Input Materials:

Dispersion A: aqueous styrene/acrylate polymer dispersion of an adhesive polymer based on n-butyl acrylate, styrene and acrylic acid; solids content 46%; glass transition temperature +7° C.

Epotal® FLX 3628 X about 53% aqueous acrylate polymer dispersion of an adhesive polymer based on acrylate esters and methacrylate esters Epotal® FLX 3621 about 53% aqueous polyurethane dispersion of an adhesive polymer based on a polyether-polyurethane elastomer Luvitec® K90: polyvinylpyrrolidone having a K value of 88.0 to 92.0
(measured as 1% solution at 25° C. in water),
employed as 20% solution in water Luvitec® K30: polyvinylpyrrolidone having a K value of 27.0-33.0
(measured as 1% solution at 25° C. in water),
employed as 20% solution in water Tego® Antifoam 2291: defoamer based on paraffin oil Basonat® LR 9056 crosslinker based on a hexamethylene diisocyanate isocyanurate

Examples 1-14

The composition of the examples and the results of the Billhöfer foam test are summarized in Table 1.

Viscosity was measured using a DIN flow cup no. 4 according to DIN EN ISO 2431:2011.

TABLE 1

Composition of the dispersion adhesive compositions, foam tests

| Example | Polymer dispersion 100 parts by wt | Parts by wt of additives | SC [1] [% by wt] | Viscosity [s] | Foam test [min] |
|---|---|---|---|---|---|
| 1 | Dispersion A | 0.2 Tego ® Antifoam 2291<br>4 Luvitec ® K90 | 45.6 | 19.5 | >120 |
| 2 | Dispersion A | 0.2 Tego ® Antifoam 2291<br>4 Luvitec ® K90<br>5 Basonat ® LR 9056 | 48.1 | 26.5 | >120 |
| 3 [2] | Dispersion A | 0.2 Tego ® Antifoam 2291 | 46.6 | 12.5 | 90 |
| 4 | Dispersion A | 4 Luvitec ® K90 | 45.6 | 19.5 | >120 |
| 5 [2] | Dispersion A | — | 46.6 | 12.5 | 6 |
| 6 | Dispersion A | 2 Luvitec ® K90 | 46.1 | 15.0 | >120 |
| 7 | Dispersion A | 1 Luvitec ® K90 | 46.3 | 14.0 | >120 |
| 8 | Dispersion A | 4 Luvitec ® K30 | 45.6 | 14.0 | 62 |
| 9 [2] | Epotal ® FLX 3628 X | — | 46.0 | 13.5 | 4 |
| 10 | Epotal ® FLX 3628 X | 2 Luvitec ® K90 | 45.5 | 17.5 | 18 |
| 11 [2] | Epotal ® FLX 3628 X | 0.2 Tego ® Antifoam 2291 | 46.0 | 13.5 | 53 |
| 12 [2] | Epotal ® FLX 3621 | — | 45.0 | 12.5 | 2 |
| 13 | Epotal ® FLX 3621 | 0.2 Luvitec ® K90 | 45.0 | 19.0 | 23 |
| 14 [2] | Epotal ® FLX 3621 | 0.2 Tego ® Antifoam 2291 | 45.0 | 12.5 | >120 |

[1] solids content
[2] comparative

The results show a markedly lower propensity for foam formation for the inventive examples (with polyvinylpyrrolidone) than for the noninventive examples without polyvinylpyrrolidone.

Performance Tests:

Billhöfer Foam Test

The foam tester consists of a reservoir vessel having a volume of 1000 ml, a smooth roller having a diameter of 100 mm which dips about 10 mm into the test dispersion and a plastic doctor blade. 500 ml of the polymer dispersion to be tested are added to the reservoir vessel at room temperature. At time x=0 min, the smooth roller is set to a rotational speed of 250 rpm using a motor. The end of the test is reached as soon as the first quantities of the test dispersion overflow the edge of the reservoir vessel but at the latest after 120 minutes. The result is reported in minutes of test duration.

The invention claimed is:

1. A process for producing adhesive-coated articles, comprising:
    applying an aqueous dispersion adhesive composition to a film substrate using a coating machine with at least one rotating roller,
    wherein the aqueous dispersion adhesive composition comprises
    at least one adhesive polymer dispersed in the aqueous phase and
    at least one polyvinylpyrrolidone dissolved in the aqueous phase,
    wherein the web speed of the film substrate is not less than 150 m/min, and
    wherein the coated film substrate is optionally bonded to a further substrate.

2. The process of claim 1, wherein the adhesive-coated articles are selected from the group consisting of laminates and pressure-sensitive adhesive articles.

3. The process of claim 1, wherein the adhesive-coated articles are composite films, and wherein at least two films are bonded to one another using the aqueous dispersion adhesive composition.

4. The process of claim 1, wherein in the Billhofer foam test measured at 250 m/min, the aqueous dispersion adhesive composition exhibits a value of greater than 120 minutes.

5. The process of claim 1, wherein the at least one polyvinylpyrrolidone has a K value of 25 to 100 measured at 25° C. as a 1% solution in water.

6. The process of claim 1, wherein the aqueous dispersion adhesive composition comprises
from 30% to 60% by weight of the at least one adhesive polymer and
from 0.02% to 2% by weight of the at least one polyvinylpyrrolidone, each relative to a total weight of the aqueous dispersion adhesive composition.

7. The process of claim 1, wherein the at least one adhesive polymer has a glass transition temperature of −40° C. to +15° C., as measured by differential scanning calorimetry at a heating rate of 20° C./min.

8. The process of claim 1,
wherein the at least one adhesive polymer is selected from the group consisting of polyurethanes and polymers producible by free-radical emulsion polymerization of ethylenically unsaturated, free-radically polymerizable monomers comprising:
a) at least 60% by weight, based on the total amount of monomers, of at least one monomer selected from the group consisting of C1- to C20-alkyl acrylates, C1- to C20-alkyl methacrylates, vinyl esters of carboxylic acids comprising up to 20 carbon atoms, vinylaromatics having up to 20 carbon atoms, vinyl halides, vinyl ethers of alcohols comprising 1 to 10 carbon atoms, aliphatic hydrocarbons having 2 to 8 carbon atoms and one or two double bonds, and mixtures of these monomers,
b) at least 0.1% by weight, based on the total amount of monomers, of at least one monomer having at least one acid group; and
c) optionally at least one further monomer distinct from the monomers a) and b).

9. The process of claims 8, wherein the monomers a) are at least one selected from the group consisting of C1- to C10-alkyl acrylates, C1- to C10-alkyl methacrylates, and styrene.

10. The process of claims 8, wherein the monomers a) are employed in an amount of at least 80% by weight, based on the total amount of the monomers, and are at least one selected from the group consisting of C- to C10-alkyl acrylates, C1- to C10-alkyl methacrylates, styrene, and a mixture thereof; and
wherein the monomers b) are employed in an amount of 0.5% to 5% by weight, based on the total amount of the monomers, and are at least one selected from the group consisting of acrylic acid, methacrylic acid, itaconic acid, and a mixture thereof.

11. The process of claim 1, wherein the at least one adhesive polymer is at least one polyurethane constructed from
a) at least one monomeric diisocyanate,
b) at least one diol, of which
b1) 10 to 100 mol %, based on the total amount of the diols (b), have a molecular weight of 500 to 5000 g/mol and
b2) 0 to 90 mol %, based on the total amount of the diols (b), have a molecular weight of 60 to 500 g/mol,
c) at least one monomer distinct from the monomers (a) and (b) having at least one isocyanate group or at least one isocyanate-reactive group which further bears at least one hydrophilic group or a potentially hydrophilic group, and
d) optionally at least one further compound distinct from the monomers (a) to (c) having at least two reactive groups selected from the group consisting of alcoholic hydroxyl groups, primary amino groups, secondary amino groups, and isocyanate groups, and
e) optionally at least one monofunctional compound distinct from the monomers (a) to (d) having a reactive group which is at least one selected from the group consisting of an alcoholic hydroxyl group, a primary or secondary amino group, and an isocyanate group.

12. The process of claim 11, wherein:
the at least one monomeric diisocyanate a) is selected from diisocyanates of the formula X(NCO)$_2$, wherein X represents at least one selected from the group consisting of an acyclic aliphatic hydrocarbon radical having 4 to 15 carbon atoms, a cycloaliphatic hydrocarbon radical having 6 to 15 carbon atoms, an aromatic hydrocarbon radical having 6 to 15 carbon atoms, and an araliphatic hydrocarbon radical having 7 to 15 carbon atoms;
the diols b1) are selected from the group consisting of polyester diols, polycarbonate diols, and polyether diols; and
the compound c) is selected from the group consisting of dihydroxycarboxylic acids, diaminocarboxylic acids, and diaminosulfonic acids.

13. The process of claims 11, wherein the content of anionic or potentially anionic groups in the at least one polyurethane is 30 to 1000 mmol/kg of the at least one polyurethane.

14. The process of claim 1, wherein the at least one adhesive polymer is producible by free-radical emulsion polymerization of ethylenically unsaturated, free-radically polymerizable monomers comprising:
a) 60% to 99.9% by weight, based on the total amount of monomers, of at least one monomer selected from the group consisting of C1- to C20-alkyl acrylates, C1- to C20-alkyl methacrylates, and vinylaromatics having up to 20 carbon atoms; and
b) 0.1% to 5% by weight, based on the total amount of monomers, of at least one monomer having at least one acid group selected from acrylic acid, methacrylic acid, and itaconic acid; and
c) 0% to 10% by weight, based on the total amount of monomers, of further monomers distinct from the monomers a) to b), selected from the group consisting of acrylamide, methacrylamide, N-methylolacrylamide, N-methylolmethacrylamide, phenyloxyethylglycol mono(meth)acrylate, hydroxyl-comprising monomers, amino- comprising monomers, nitriles, alpha,beta-monoethylenically unsaturated C3-C8-carboxylic acids, bifunctional monomers which comprise not only an ethylenically unsaturated double bond but also at least one glycidyl group, bifunctional monomers which comprise not only an ethylenically unsaturated double bond but also at least one oxazoline group, bifunctional monomers which comprise not only an ethylenically unsaturated double bond but also at least one ureido group, bifunctional monomers which comprise not only an ethylenically unsaturated double bond but also at least one ureido-analogous group, and crosslinking monomers having more than one free-radically polymerizable group.

15. The process of claims 1, wherein the at least one adhesive polymer dispersed in the aqueous phase is a styrene/acrylate copolymer formed from a monomer mixture comprising styrene and at least one monomer selected from the group consisting of C1- to C20-alkyl acrylates and C1- to C20-alkyl methacrylates.

16. The process of claim 1, wherein the aqueous dispersion adhesive composition comprises water-dispersed polymer particles having an average particle diameter of greater than 200 nm,
wherein the water-dispersed polymer particles have a monomodal particle size distribution and a uniform glass transition temperature,
wherein the water-dispersed polymer particles are produced by free-radical emulsion polymerization of a single monomer mixture comprising ethylenically unsaturated, free-radically polymerizable monomers and less than 0.8 parts by weight of emulsifier, based on 100 parts by weight of monomers,
wherein the water-dispersed polymer particles are produced using a polymer seed, without addition of protective colloids, and without formation of protective colloids in situ,
wherein the single monomer mixture comprises:
a) at least 60% by weight, based on the total amount of monomers, of at least one monomer selected from the group consisting of C1- to C20-alkyl acrylates, C1- to C20-alkyl methac-rylates, vinyl esters of carboxylic acids comprising up to 20 carbon atoms, vinylaromatics having up to 20 carbon atoms, vinyl halides, vinyl ethers of alcohols comprising 1 to 10 carbon atoms, aliphatic hydrocarbons having 2 to 8 carbon atoms and one or two double bonds, and mixtures of these monomers,
b) at least 0.1% by weight, based on the total amount of monomers, of at least one monomer having at least one acid group; and
c) optionally at least one further monomer distinct from the monomers a) and b);
wherein the feeding of the monomer mixture is carried out during the polymerization at a first feed rate and least one second feed rate,
wherein the first feed rate is slower than the second feed rate,
wherein the acid groups of the monomers b) are fully or partially neutralized by feeding of a base during the emulsion polymerization, and
wherein the feeding of the base commences during the emulsion polymerization once at least 5% by weight, preferably 10% to 70% by weight, of the total monomer mixture is present in the reaction vessel under polymerization conditions.

17. The process of claim 1, wherein the aqueous dispersion adhesive composition further comprises at least one crosslinkable adhesive polymer dispersed in the aqueous phase and at least one reactive crosslinker.

18. The process of claim 17, wherein the at least one reactive crosslinker is a polyisocyanate.

19. The process of claim 18, wherein the film substrate comprises at least one selected from the group consisting of polyethylene, oriented polypropylene, unoriented polypropylene, polyamide, polyethylene terephthalate, polyacetate, cellophane, metallized films, and metal foils.

20. The process of claim 1, wherein the aqueous dispersion adhesive composition is free from defoamers based on silicone and/or is free from defoamers based on organic oils.

21. A method for producing films mechanically coated with an aqueous dispersion adhesive composition, or for laminating rigid shaped articles with flexible decorative films mechanically coated with an aqueous dispersion adhesive composition, the method comprising:
applying the aqueous dispersion adhesive composition to a film substrate by means of a coating machine having at least one rotating roller,
wherein the web speed of the film substrate is at least 150 m/minute, and
wherein the aqueous dispersion adhesive composition comprises:
(a) at least one adhesive polymer dispersed in the aqueous phase and
(b) polyvinylpyrrolidone dissolved in the aqueous phase.

22. A method of producing a coated film substrate, comprising:
applying an aqueous dispersion adhesive composition to a film substrate using a coating machine having at least one rotating roller,
wherein the web speed of the film substrate is at least 150 m/minute, and
wherein the aqueous dispersion adhesive composition comprises polyvinylpyrrolidone as a defoamer.

* * * * *